United States Patent [19]

Müller

[11] Patent Number: 5,335,747
[45] Date of Patent: Aug. 9, 1994

[54] ALL-WHEEL DRIVE FOR A MOTOR VEHICLE

[75] Inventor: Robert Müller, Monsheim, Fed. Rep. of Germany

[73] Assignee: Dr. Ing. h.c.F. Porsche AG, Fed. Rep. of Germany

[21] Appl. No.: 955,723

[22] PCT Filed: Jun. 15, 1991

[86] PCT No.: PCT/EP91/01113

§ 371 Date: Feb. 11, 1993

§ 102(e) Date: Feb. 11, 1993

[87] PCT Pub. No.: WO91/19620

PCT Pub. Date: Dec. 26, 1991

[30] Foreign Application Priority Data

Jun. 21, 1990 [DE] Fed. Rep. of Germany ....... 4019764

[51] Int. Cl.⁵ .............................................. B60K 17/35
[52] U.S. Cl. ..................................... 180/249; 180/248; 475/206
[58] Field of Search .............. 475/198, 199, 207, 208, 475/232, 258, 260, 339; 180/247, 248; 74/665 GA

[56] References Cited

U.S. PATENT DOCUMENTS

| 4,367,661 | 1/1983 | Moroto et al. ............... 74/665 G X |
| 4,586,483 | 5/1986 | Yamakawa et al. ................. 180/247 |
| 4,691,593 | 9/1987 | Mueller .......................... 475/260 X |
| 4,719,985 | 1/1988 | Zaiser ............................ 475/205 X |
| 4,757,728 | 7/1988 | Pitsch .............................. 475/248 X |
| 4,909,344 | 3/1990 | Mueller et al. ...................... 180/247 |
| 5,226,503 | 7/1993 | Müller ............................ 180/248 X |

FOREIGN PATENT DOCUMENTS

| 0352994 | 7/1989 | European Pat. Off. . |
| 3507490 | 3/1986 | Fed. Rep. of Germany . |
| 2108221 | 5/1983 | United Kingdom . |

OTHER PUBLICATIONS

PCT International Preliminary Examination Report, dated Nov. 23, 1992, German and English translation.

*Primary Examiner*—Leslie A. Braun
*Assistant Examiner*—Khoi Ta
*Attorney, Agent, or Firm*—Evenson, McKeown, Edwards & Lenahan

[57] ABSTRACT

An all-wheel drive for a motor vehicle has a first transmission line which starts out from a change-speed gearbox and leads to the rear axle and a second transmission line branching off from the first transmission line and leading to the front axle. The second transmission line can be connected by a permanently acting all-wheel locking system as a function of the rotational speed difference between the drive shaft and the output shaft of the all-wheel locking system. In the first transmission line, a separating coupling is inserted behind the branch-off point to the second transmission line, this separating coupling being operable as a function of parameters of the motor vehicle.

9 Claims, 3 Drawing Sheets

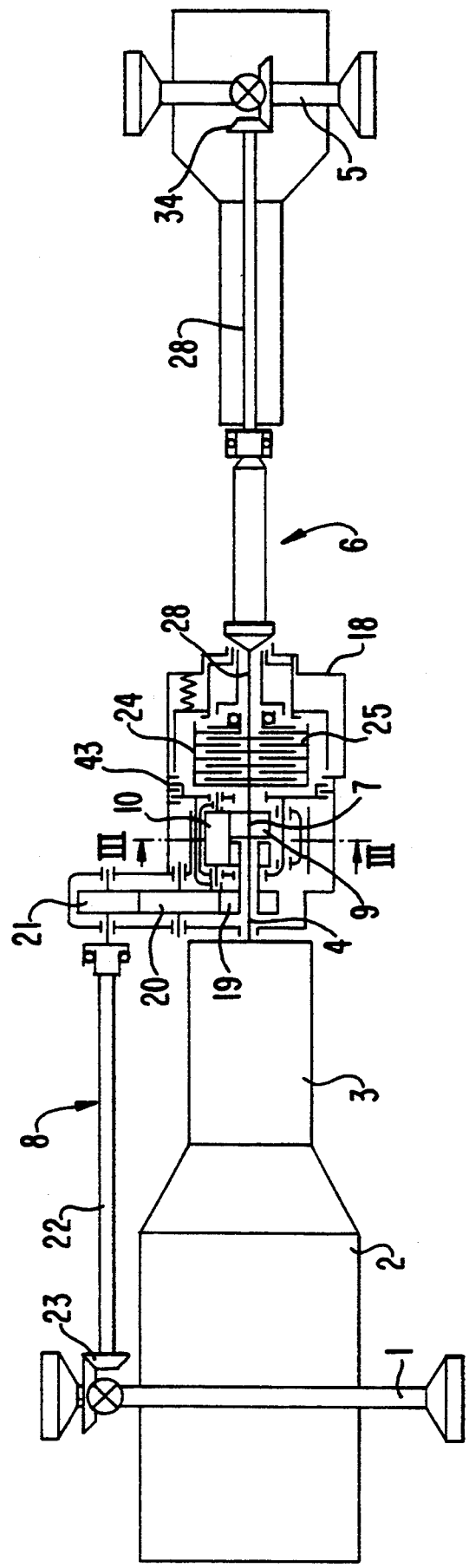
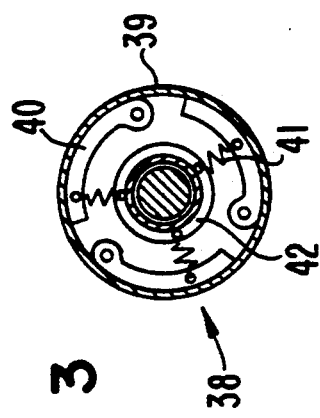
FIG. 1
FIG. 3

ALL-WHEEL DRIVE FOR A MOTOR VEHICLE

BACKGROUND AND SUMMARY OF THE INVENTION

The present invention relates to an all-wheel drive for a motor vehicle comprising a first transmission line, which starts out from a change-speed gearbox and leads to a first vehicle axle and a second transmission line, which branches off from the first transmission line and leads to the second vehicle axle.

An all-wheel drive such as the type described above in German Patent Document 35 07 490. From a transmission line leading to the front axle, which is rigidly driven by a front engine, a transmission line branches off to the rear axle and can be connected by way of an all-wheel locking system. The locking system used in this case comprises a planetary transmission which provides the direct through-drive and a centrifugal brake applied to its planet carrier. On the planetary transmission, the ratio of the input shaft to the output shaft deviates only slightly from 1:1; however the ratio of the input shaft to the planet carrier is very high, for example, 16:1. The planetary transmission comprises an input sun gear which is non-rotatable with respect to the input shaft; an output sun gear which is disposed coaxially next to the input sun gear, is connected with the output shaft and has a slightly lower number of teeth; as well as the planet gears which mesh with both sun gears simultaneously and are disposed on the planet carrier. On the planet carrier, bearing bolts are mounted on which brake shoes are disposed in such a manner that they act as centrifugal weights and, by means of their brake linings, can rest against a stationary brake drum. When a rotational speed difference occurs between the front axle and the rear axle, a locking moment is generated which rises progressively with the rotational speed difference and results in an optimal traction of the vehicle. Beyond that, however, in the case of motor vehicles to be newly developed, more and more requirements come to the foreground with respect to directional control, ABS-capability, and driving safety in general, and also in marginal situations.

It is an object of the invention to provide an all-wheel drive which permits the implementation of an optimal handling with respect to driving dynamics in the case of braking operations, cornering and when starting and accelerating the motor vehicle.

These and other objects are achieved by the present invention which provides an all-wheel drive for a motor vehicle comprising a drive shaft and an output shaft, and a first transmission line which is coupled to a change speed gearbox and a first vehicle axle. A second transmission line branches off at a branch-off point from the first transmission line and leads to a second vehicle axle. A permanently operative all-wheel locking system connects the second transmission line between the drive shaft and the output shaft as a function of a rotational speed difference. A shiftable locking coupling is coupled to the wheel locking system that is operable to lock the all-wheel locking system in such a manner that the second vehicle axle is driven rigidly by the second transmission line. A shiftable separating coupling is inserted in the first transmission line according to the power flux behind the branch-off point to the second transmission line.

When a shiftable separating coupling is inserted into a first transmission line leading to the rear axle behind the branch-off point to the second transmission line leading to the front axle, it becomes possible, by opening up the separating coupling, to separate the rear axle completely from the front axle and from the drag moment of the engine. This separation takes place when the vehicle brake is actuated controlled by the ABS signal in approximately 130 ms. Thus, an optimal ABS-compatibility and directional control is achieved. In the coasting operation of the motor vehicle, the separating coupling does not open up so that an engine braking can take place with respect to all 4 wheels.

Other objects, advantages and novel features of the present invention will become apparent from the following detailed description of the invention when considered in conjunction with the accompanying drawings.

BRIEF DESCRIPTION OF THE DRAWINGS

FIG. 1 is an all-wheel driving diagram of a motor vehicle constructed in accordance with an embodiment of the present invention;

FIG. 3 is a view of the centrifugal brake of the planet gear locking system.

DETAILED DESCRIPTION OF THE DRAWINGS

Figure 2:
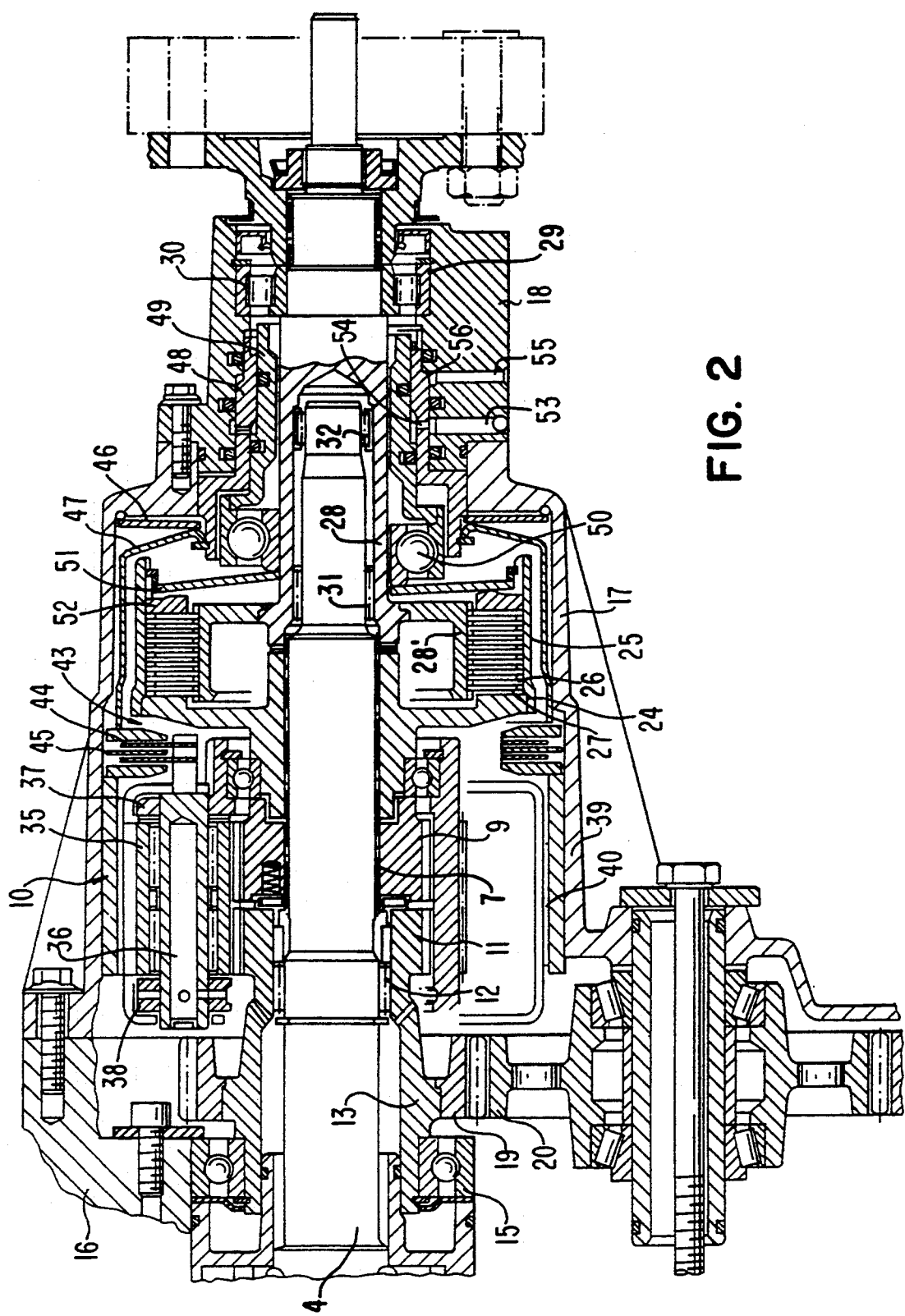
FIG. 2 is a longitudinal sectional view of the transmission lines to the front axle and to the rear axle.

In FIG. 1, an engine 2 is shown arranged close to the front axle 1 on a motor vehicle, and by way of a change-speed gearbox 3 and a drive shaft 4, drives a first transmission line 6 leading to the rear axle 5 and a transmission line 8 which is connected to it at a branch-off point 7 and leads to the front axle. As the branch-off point 7, a serrated coupling is used with respect to which an input sun gear 9 of a planet gear locking system 10 is non-rotatable on the drive shaft 4. Coaxially to the input sun gear 9, an output sun gear 11 (FIG. 2) with a slightly lower number of teeth is disposed next to it on the drive shaft 4 by means of a needle bearing 12. The output sun gear 11 is constructed in one piece with a hollow output shaft 13 which on its outer side is disposed in a forward bearing housing 16 by means of a ball bearing 15. The bearing housing 16, a lock housing 17 and a hydraulic housing 18 together form a housing which encloses the all-wheel driving system, the three housing parts 16, 17, 18 being centered with respect to one another and being fastened to one another in a sealed manner. Approximately in the center between the needle bearing 12 and the ball bearing 15, a gear wheel 19 is fastened on the output shaft 13 which, by way of an idler gear 20, drives a gear wheel 21 of an output shaft 22 which drives the front axle 1 via a bevel gear angle drive 23.

On the shaft piece of the drive shaft 4 situated behind the branch-off point 7, a coupling housing 24 is non-rotatably disposed by means of a serrated coupling, this coupling housing 24 surrounding a separating coupling 25 for the first transmission line 6. Outer plates 26 are non-rotatable and longitudinally slidable in the coupling housing 24. They interact with the inner plates 27 which are non-rotatably fastened on a plate support 28' which is connected with the output shaft 28 to the rear axle 5. The output shaft 28 has a hollow construction and is disposed in bearings 29, 30 of the hydraulic housing 18. In the output shaft 28, the drive shaft 4 is disposed by means of two needle bearings 31, 32. By way of a universal-joint shaft 33 and a bevel gear angle drive 34, the output shaft 28 drives the rear axle 5.

Three planet gears 35, which are disposed on bearing bolts 36 of the planet carrier 37, mesh with the input sun gear 9 and the output sun gear 11. On one set of ends of the bearing bolts 36, a centrifugal brake 38 is mounted which is illustrated in detail in FIG. 3. The brake shoes 40, which rotate together with the planet carrier 37 and can be swivelled on the bearing bolts 36, can be pressed by means of centrifugal force against a stationary brake drum 39 of the lock housing 17. Tension springs 41, by means of which the brake shoes 40 are attached to a central, hollow-drilled brake shaft 42, which rotates along with the planet carrier 37, act against the centrifugal force.

The input sun gear has a tooth number Z=47; the output sun gear has a tooth number Z=44. The ratio of the input sun gear to the planet carrier is 15⅔:1. When a difference in rotational speed occurs between the drive shaft 4 and the output shaft 13, the planet carrier 37 and the brake shoes 40 are set in rotation at a ratio of 15⅔ to the differential rotational speed. The brake shoes 40 build up a locking moment which rises proportionally to the rotational speed difference.

At the other ends of the bearing bolts 36, a locking coupling 43 is situated in order to prevent the rotating of the planet carrier 37 in certain driving situations and to implement a rigid drive connection between the front axle 1 and the rear axle 5. Inner plates 44 are fastened to the bearing bolts 36; they interact with outer plates 45 of the lock housing 17. The locking coupling 43 is closed by means of a disk spring 46 which is supported between the hydraulic housing 18 and an actuating bell 47. The locking coupling 43 is opened against the force of the disk spring 46 by means of an outer hydraulic piston 48 which is guided longitudinally in the hydraulic housing 18. An inner hydraulic piston 49 guided in the outer hydraulic piston 48 actuates a disk spring 51 by way of a meshing bearing 50 and actuates the separating coupling 25 by way of a pressure piece 52. The locking coupling 43 is closed by spring force in a pressureless manner; the separating coupling 25 is open in a pressureless manner.

In a normal operating condition, the inner hydraulic piston 49 is displaced to the left by way of the pressure connection 53 and radial ducts 54, and the outer hydraulic piston 48 is displaced to the right so that the separating coupling 25 is closed and the power flux to the rear axle is therefore established. At the same time, the locking coupling 43 is opened up by means of the outer hydraulic piston 48 and the planet carrier 35 of the all-wheel locking system is therefore released. The hydraulic actuating devices (i.e. the hydraulic pistons 48,49) are controllable as a function of parameters of the motor vehicle.

In the case of an ABS-operation as well as during towing and performance tests of the motor vehicle, the pressure connection 53 is pressureless; the separating coupling 25 is open; the locking coupling 45 is closed. The rear axle 5 is therefore cut off; the front axle is rigidly coupled to the engine 2.

If, at the same time as the pressure connection 53 is acted upon by pressure, the same pressure is fed to the pressure connection 55, the outer hydraulic piston 48 is displaced toward the left along its larger outer area of attack 56. The locking coupling 43 is closed without uncoupling the rear axle 5. A rigid drive exists to the front axle 1 and to the rear axle 5.

Figure 4:
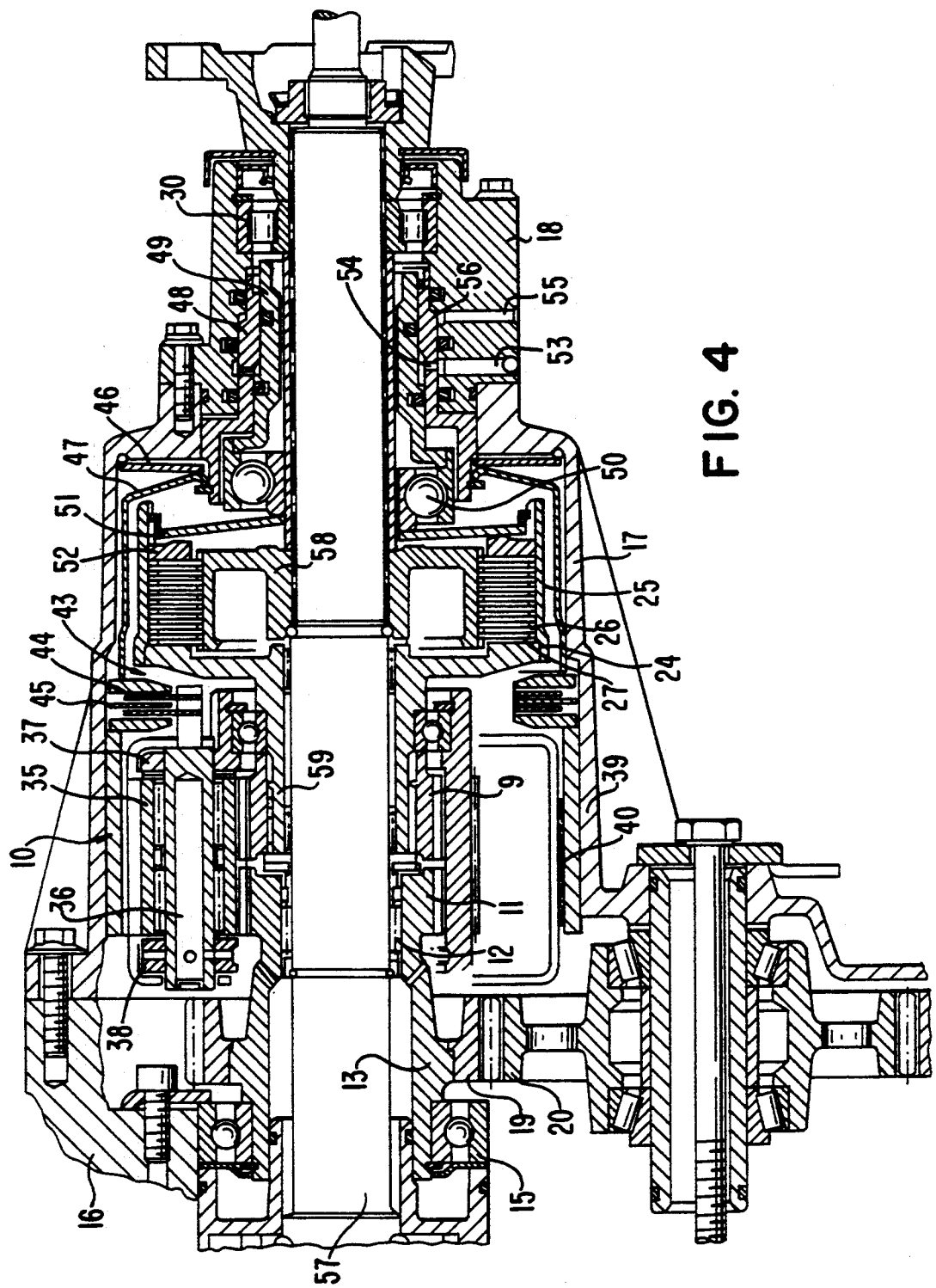
FIG. 4 is a longitudinal sectional view of another embodiment of the transmission lines.

In a modified embodiment of the invention according to FIG. 4, a centric drive shaft 57 penetrates the all-wheel drive and forms a rigid drive to the rear axle 5. The plate carrier 58 of the separating coupling 25 is non-rotatably disposed on the drive shaft 57; the coupling housing 24 of the separating coupling 25 is disposed on the drive shaft 57. On a lengthening 59 of the coupling housing 24, the input sun gear 9 of the planet gear locking system 10 is non-rotatably disposed. All other parts are constructed and arranged in the same manner as in the case of the above-described first embodiment of the invention.

When the separating coupling 25 is closed, in addition to the rear axle 5, the front axle 1 is ready to operate. It is connected as soon as a certain rotational speed difference occurs between the rear axle 5 and the front axle 1. By means of the illustrated planetary gear locking system 10, a characteristic locking moment—rotational speed difference curve can be produced which rises quadratically.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An all-wheel drive for a motor vehicle, comprising:
    a central drive shaft and an output shaft;
    a first transmission line, which is coupled to a change-speed gearbox and to a first vehicle axle;
    a second transmission line which leads to a second vehicle axle, wherein the first transmission line is of one-piece continuous with the central drive shaft and wherein, shiftable separating coupling and a permanently operative all-wheel interaxle differential system are disposed behind one another, by way of which, as a function of the rotational speed difference between the central drive shaft and the output shaft, the second vehicle axle can be connected and;
    a shiftable locking coupling coupled to the all-wheel interaxle differential system and which controllably locks the all-wheel interaxle differential system such that the second transmission line is driven rigidly by the first transmission line.

2. An all-wheel drive according to claim 1, further comprising hydraulic actuating devices coupled to the shiftable separating coupling and the shiftable locking coupling, the hydraulic actuating device being controlled as a function of parameter of a motor vehicle.

3. An all-wheel drive according to claim 2, wherein the separating coupling is separated in response to a reduction in pressure and the locking coupling is locked in response to a reduction in pressure.

4. An all-wheel drive according to claim 1, wherein the interaxle differential system with the locking coupling, the separating coupling and the hydraulic system for the actuating devices in this sequence, are arranged coaxially with respect to one another and are enclosed by a stationary housing.

5. An all-wheel drive according to claim 1, wherein the interaxle differential system comprises a planetary gear providing a direct through drive from the central drive shaft to the output shaft and to a planet carrier, the gear wheel ratio from the central drive shaft to the output shaft slightly deviating from 1:1, the gear wheel transmission from the central drive shaft to the planetary carrier being significantly larger than 1:1.

6. An all-wheel drive according to claim 5, wherein the planetary gear comprises an input sun gear which is rotatably mounted on the central drive shaft, a one-piece output sun gear which is next to the input sun gear on the central drive shaft, the output sun gear being integral with the output shaft and having a slightly different tooth number than the input sun gear, and planet gears which mesh simultaneously with the input and the output sun gears and are disposed on bearing bolts of the planet carrier, wherein the output shaft is hollow.

7. An all-wheel drive according to claim 6, wherein the shiftable locking coupling comprises a plurality of inner plates and outer plates which are frictionally coupleable with one another, the outer plates being non-rotatable and longitudinally slidable on a coupling housing and the inner plates being non-rotatable and longitudinally slidable on the bearing bolt of the planet carrier.

8. An all-wheel drive according to claim 1, wherein the shiftable separating coupling comprises several inner plates and other plates which are frictionally coupleable with one another, the outer plates being non-rotatable and longitudinally slidable on a coupling housing coupled with an input to the interaxle differential and the inner plates being non-rotatable and longitudinally slidable with respect to the central shaft coupled to the first vehicle axle.

9. An all-wheel drive according to claim 1, wherein the first and second transmission lines leading to the second vehicle axle and the first vehicle axle have slightly different overall ratios.

* * * * *